(12) United States Patent
Kwon et al.

(10) Patent No.: US 9,252,452 B2
(45) Date of Patent: Feb. 2, 2016

(54) ELECTRODE ASSEMBLY AND COMPOSITE ELECTRODE ASSEMBLY OF STAIR-LIKE STRUCTURE

(71) Applicant: LG CHEM, LTD., Seoul (KR)

(72) Inventors: Sungjin Kwon, Daejeon (KR); Soonho Ahn, Seoul (KR); Dong-Myung Kim, Daejeon (KR); Ki Woong Kim, Daejeon (KR); Pillgyu Jang, Daejeon (KR); Young Hoon Kim, Daejeon (KR); Sunghan Yoon, Daejeon (KR); Hyun Park, Daejeon (KR)

(73) Assignee: LG Chem, Ltd. (KR)

( * ) Notice: Subject to any disclaimer, the term of this patent is extended or adjusted under 35 U.S.C. 154(b) by 313 days.

(21) Appl. No.: 13/837,159

(22) Filed: Mar. 15, 2013

(65) Prior Publication Data

US 2013/0295436 A1   Nov. 7, 2013

Related U.S. Application Data

(63) Continuation of application No. PCT/KR2013/002118, filed on Mar. 15, 2013.

(30) Foreign Application Priority Data

Mar. 20, 2012 (KR) .................. 10-2012-0028368
Nov. 8, 2012 (KR) .................. 10-2012-0125768

(51) Int. Cl.
*H01M 10/04* (2006.01)
*H01M 2/16* (2006.01)
(Continued)

(52) U.S. Cl.
CPC ........ *H01M 10/0431* (2013.01); *H01M 2/1673* (2013.01); *H01M 2/18* (2013.01);
(Continued)

(58) Field of Classification Search
CPC .............. H01M 10/0431; H01M 10/0436; H01M 10/0585; H01M 10/052; H01M 2/1673; H01M 2/266
USPC .................. 429/159, 160, 185, 211
See application file for complete search history.

(56) References Cited

U.S. PATENT DOCUMENTS 3,442,717 A   5/1969   Horn et al.
4,092,464 A   5/1978   Dey et al.
(Continued)

FOREIGN PATENT DOCUMENTS

CN   101107736 A   1/2008
EP   1309018 A2   5/2003
(Continued)

OTHER PUBLICATIONS

International Search Report for Application No. PCT/KR2013/002118 dated Jun. 28, 2013.
(Continued)

*Primary Examiner* — Karie O'Neill Apicella
(74) *Attorney, Agent, or Firm* — Lerner, David, Littenberg, Krumholz & Mentlik, LLP

(57) ABSTRACT

Disclosed herein are an electrode assembly and a composite electrode assembly mounted in a battery case of a secondary battery. The electrode assembly and the composite electrode assembly have a stair-like structure. The stair-like structure is formed based on the curvature of a device to utilize a dead space of the device, thereby improving the capacity of the device per unit volume.

8 Claims, 11 Drawing Sheets

(51) Int. Cl.
*H01M 10/052* (2010.01)
*H01M 2/26* (2006.01)
*H01M 10/0585* (2010.01)
*H01M 2/18* (2006.01)
*H01M 4/13* (2010.01)

(52) U.S. Cl.
CPC .............. *H01M 2/266* (2013.01); *H01M 4/13* (2013.01); *H01M 10/0413* (2013.01); *H01M 10/0436* (2013.01); *H01M 10/052* (2013.01); *H01M 10/0585* (2013.01); *Y02E 60/122* (2013.01)

(56) References Cited

U.S. PATENT DOCUMENTS

| | | | |
|---|---|---|---|
| 4,964,877 | A | 10/1990 | Keister et al. |
| 5,633,097 | A | 5/1997 | Miller |
| 5,652,074 | A | 7/1997 | Larson, III et al. |
| 6,224,995 | B1 | 5/2001 | Fauteux et al. |
| 6,498,951 | B1 | 12/2002 | Larson et al. |
| 6,610,443 | B2 | 8/2003 | Paulot et al. |
| 6,946,220 | B2 | 9/2005 | Probst et al. |
| 7,479,349 | B2 | 1/2009 | O'Phelan et al. |
| 7,595,132 | B2 | 9/2009 | Kang et al. |
| 2001/0005561 | A1 | 6/2001 | Yamada et al. |
| 2002/0160257 | A1 | 10/2002 | Lee et al. |
| 2003/0077509 | A1 | 4/2003 | Probst et al. |
| 2005/0164094 | A1 | 7/2005 | Kotato et al. |
| 2005/0214642 | A1 | 9/2005 | Kim et al. |
| 2006/0275661 | A1 | 12/2006 | Kim et al. |
| 2006/0286456 | A1 | 12/2006 | Fu et al. |
| 2007/0054180 | A1 | 3/2007 | Miyajima et al. |
| 2007/0287064 | A1 | 12/2007 | Suzuki et al. |
| 2008/0137890 | A1 | 6/2008 | Petersen et al. |
| 2009/0075168 | A1 | 3/2009 | Lee |
| 2009/0159582 | A1 | 6/2009 | Chami et al. |
| 2010/0112451 | A1 | 5/2010 | Shibutani et al. |
| 2011/0183183 | A1 | 7/2011 | Grady et al. |
| 2011/0274955 | A1 | 11/2011 | Park et al. |
| 2011/0287308 | A1 | 11/2011 | Kim et al. |
| 2012/0015223 | A1 | 1/2012 | Bhardwaj et al. |
| 2012/0015236 | A1 | 1/2012 | Spare |
| 2012/0135299 | A1 | 5/2012 | Kwon et al. |
| 2012/0156551 | A1 | 6/2012 | Cho |
| 2013/0144167 | A1 | 6/2013 | Lee et al. |

FOREIGN PATENT DOCUMENTS

| | | | | |
|---|---|---|---|---|
| EP | 1326680 | A1 | 7/2003 | |
| JP | 02-056856 | | 2/1990 | |
| JP | 06-260209 | | 9/1994 | |
| JP | 09-082361 | | 3/1997 | |
| JP | 10-270014 | | 10/1998 | |
| JP | H10296879 | A | 11/1998 | |
| JP | 2000133317 | A | 5/2000 | |
| JP | 2001-028275 | A | 1/2001 | |
| JP | 2001167743 | A | 6/2001 | |
| JP | 2002199910 | A | 7/2002 | |
| JP | 2003217601 | A | 7/2003 | |
| JP | 2004111219 | A * | 4/2004 | ............ H01M 10/04 |
| JP | 3611765 | B2 | 1/2005 | |
| JP | 2005169728 | A | 6/2005 | |
| JP | 3680797 | B2 | 8/2005 | |
| JP | 2006127882 | A | 5/2006 | |
| JP | 2006134604 | A | 5/2006 | |
| JP | 2006-278331 | A | 10/2006 | |
| JP | 2009-218105 | A | 9/2009 | |
| KR | 20-0207948 | | 1/2001 | |
| KR | 1020010055968 | A | 7/2001 | |
| KR | 20010104150 | A | 11/2001 | |
| KR | 1020030066960 | A * | 8/2003 | ............ H01M 10/12 |
| KR | 20050020357 | A | 3/2005 | |
| KR | 20050036466 | A | 4/2005 | |
| KR | 100670492 | B1 | 1/2007 | |
| KR | 20070066401 | A | 6/2007 | |
| KR | 1020070075941 | A | 7/2007 | |
| KR | 1020070099068 | A | 10/2007 | |
| KR | 100829553 | B1 | 5/2008 | |
| KR | 20080058772 | A | 6/2008 | |
| KR | 20080095967 | A | 10/2008 | |
| KR | 10-0866767 | B1 | 11/2008 | |
| KR | 20090003823 | A | 1/2009 | |
| KR | 20090028243 | A | 3/2009 | |
| KR | 20090062409 | A | 6/2009 | |
| KR | 20100137290 | A | 12/2010 | |
| KR | 20110105737 | A | 9/2011 | |
| KR | 20110112241 | A | 10/2011 | |
| KR | 20110128594 | A | 11/2011 | |
| KR | 20120060706 | A | 6/2012 | |
| WO | 0072392 | A1 | 11/2000 | |
| WO | 2012-009423 | A1 | 1/2012 | |
| WO | 2012053772 | A2 | 4/2012 | |
| WO | 2013-180378 | A1 | 12/2013 | |

OTHER PUBLICATIONS

Inernational Search Report for Application No. PCT/KR2013/001815 dated Jun. 27, 2013.
International Search Report for Application No. PCT/KR2013/002127 dated Jun. 27, 2013.
Chinese Office Action for Application No. 201380002792.X dated Apr. 3, 2015.
Machine translation of KR 2003-0066960 (Jang).

\* cited by examiner (a)

(b)

ELECTRODE ASSEMBLY AND COMPOSITE ELECTRODE ASSEMBLY OF STAIR-LIKE STRUCTURE

CROSS REFERENCE TO RELATED APPLICATIONS

This application is a continuation of PCT/KR2013/002118 filed on Mar. 15, 2013, which claims priority under 35 U.S.C 119(a) to Patent Application No. 10-2012-0028368 and 10-2012-0125768 filed in the Republic of Korea on Mar. 20, 2012 and Nov. 8, 2012 respectively, all of which are hereby expressly incorporated by reference into the present application.

TECHNICAL FIELD

The present invention relates to an electrode assembly mounted in a battery case of a secondary battery and, more particularly, to an electrode assembly of a stair-like structure and a composite electrode assembly of a stair-like structure.

BACKGROUND ART

With remarkable development of information technology (IT), a great variety of portable information communication devices has been popularized. As a result, in the 21$^{st}$ century, we are moving toward a ubiquitous society in which high-quality information service is possible regardless of time and place.

Lithium secondary batteries are very important to realize such a ubiquitous society. Specifically, lithium secondary batteries, which can be charged and discharged, have been widely used as an energy source for wireless mobile devices. In addition, the lithium secondary batteries have also been used as an energy source for electric vehicles and hybrid electric vehicles, which have been proposed to solve problems, such as air pollution, caused by existing gasoline and diesel vehicles using fossil fuel.

As devices, to which the lithium secondary batteries are applicable, are diversified as described above, the lithium secondary batteries have also been diversified such that the lithium secondary batteries can provide powers and capacities suitable for devices to which the lithium secondary batteries are applied. In addition, there is a strong need to reduce the size and weight of the lithium secondary batteries.

Small-sized mobile devices, such as mobile phones, personal digital assistants (PDAs), digital cameras, and laptop computers, use one or several small-sized, lightweight battery cells for each device according to the reduction in size and weight of the corresponding products.

On the other hand, middle or large-sized devices, such as electric bicycles, electric motorcycles, electric vehicles, and hybrid electric vehicles, use a middle or large-sized battery module (middle or large-sized battery pack) having a plurality of battery cells electrically connected with each other because high power and large capacity are necessary for the middle or large-sized devices. Size and weight of a battery module are directly related to a battery module installation space and power of a corresponding middle or large-sized device. For this reason, manufacturers are trying to manufacture small and lightweight battery modules.

A cylindrical battery cell, a prismatic battery cell, and a pouch-shaped battery cell, which are classified based on their shapes, are used as a unit cell of a battery module or battery pack. Among these batteries, the pouch-shaped battery cell, which can be stacked with high integration, has a high energy density per unit weight, is inexpensive, and can be easily modified, has attracted considerable attention.

FIGS. 1A and 1B are exploded perspective views typically showing the general structure of a conventional representative pouch-shaped secondary battery.

Referring to FIG. 1A, a pouch-shaped secondary battery 10 includes an electrode assembly 20 having pluralities of electrode tabs 21 and 22 protruding therefrom, two electrode leads 30 and 31 respectively connected to the electrode tabs 21 and 22, and a battery case 40 to receive the electrode assembly 20 in a sealed state such that portions of the electrode leads 30 and 31 are exposed outward from the battery case 40.

The battery case 40 includes a lower case 42 having a depressed receiving part 41, in which the electrode assembly 20 is located, and an upper case 43 to cover the lower case 42 such that the electrode assembly 20 is sealed in the battery case 40. The upper case 43 and the lower case 42 are connected to each other by thermal welding in a state in which the electrode assembly 20 is mounted therein to form an upper end sealed part 44, side sealed parts 45 and 46, and a lower end sealed part 47.

As shown in FIG. 1A, the upper case 43 and the lower case 42 may be configured as separate members. As shown in FIG. 1B, on the other hand, one end of the upper case 43 may be integrally formed at a corresponding end of the lower case 42 such that the upper case 43 and the lower case 42 may be hingedly connected to each other.

In addition, as shown in FIGS. 1A and 1B, the pouch-shaped battery cell is configured to have a structure in which electrode terminals constituted by the electrode tabs and the electrode leads connected to the electrode tabs are formed at one end of the stacked type electrode assembly. Alternatively, a pouch-shaped battery cell configured to have a structure in which electrode terminals are formed at one end and the other end of an electrode assembly may also be manufactured using the above method.

DISCLOSURE

Technical Problem

As shown in FIGS. 1A and 1B, the electrode assembly is generally manufactured so as to have an approximately rectangular parallelepiped structure. The electrode assembly is mounted in a battery case to manufacture a pouch-shaped battery cell having a rectangular parallelepiped structure. A plurality of such pouch-shaped battery cells is stacked to constitute a battery pack having a rectangular parallelepiped structure.

However, a device, to which the battery cell having the rectangular parallelepiped structure or the battery pack having the rectangular parallelepiped structure is applied, is not generally formed in the shape of a rectangular parallelepiped. For example, sides of a smartphone may be curved to improve grip.

In a case in which the battery cell having the rectangular parallelepiped structure or the battery pack having the rectangular parallelepiped structure is mounted in a device designed so as to have such curved portions, however, space utilization of the device may be lowered.

That is, the curved portions of the device have dead spaces, in which the battery cell or the battery pack cannot be mounted. Ultimately, such dead spaces lower the capacity of the device per unit volume.

Therefore, the present invention has been made to solve the above problems, and it is an object of the present invention to provide an electrode assembly of a stair-like structure and a composite electrode assembly of a stair-like structure that are capable of maximally improving the capacity of a device per unit volume and a battery cell including the same.

Technical Solution

In accordance with one aspect of the present invention, the above and other objects can be accomplished by the provision of an electrode assembly including two or more electrode plates, each of which has electrode tabs, and a one-unit sheet type separation film to cover one major surface and the other major surface of each of the electrode plates and side surfaces of the electrode plates, which constitute an electrode tab non-formation region, wherein the electrode plates are stacked in a height direction on the basis of a plane such that the electrode plates having opposite polarities face each other in a state in which the separation film is disposed between the electrode plates, and the electrode plates include one or more electrode plates and one or more other electrode plates having the same size as or different sizes from one or more electrode plates and a stack structure of the electrode groups having different sizes forms a stair-like structure including one or more steps, each having a width and a height.

In a case in which n electrode groups having different stack areas are stacked, the stair-like structure may have n steps, where, n is a natural number equal to or greater than 2 and may be properly adjusted in consideration of the capacity of a device or the curvature of the outside of the device.

Specifically, the electrode plates may include two or more electrode plates. In this case, the two or more electrode plates may have different sizes. Alternatively, one of the electrode plates may have a size different from that of the other electrode plates having the same size. In addition, the electrode plates may include a combination of two or more electrode plates (A) having the same size and two or more electrode plates (B) having the same size, the size of the electrode plates (B) being different from that of the electrode plates (A). Alternatively, the electrode plates may include a combination of two or more electrode plates (A) having the same size, two or more electrode plates (B) having the same size, the size of the electrode plates (B) being different from that of the electrode plates (A), and two or more electrode plates (C) having the same size, the size of the electrode plates (C) being different from those of the electrode plates (A) and the electrode plates (B).

The shape of each of the electrode plates is not particularly restricted. For example, each of the electrode plates may be formed in the shape of a parallelepiped. Alternatively, each of the electrode plates may be formed in a polygonal or circular shape in plane. Furthermore, each of the electrode plates may be formed in a flat shape or a curved flat shape.

Specifically, each of the electrode plates may be formed in the shape of a parallelepiped having an overall width, an overall length, and an overall height. The parallelepiped may be formed in a quadrangular shape in plane. In this case, the overall width may be the length of one side from which the electrode tabs protrude and the overall length may be the length of one side from which the electrode tabs do not protrude. In addition, the overall height may be the height of the parallelepiped.

In order to form the stair-like structure, the electrode assembly according to the present invention may include one or more electrode plates have different overall lengths and/or overall widths.

Therefore, electrode plates having different sizes may be electrode plates having different overall lengths and/or overall widths.

For example, the number of electrode plates having different overall lengths and/or overall widths included in the electrode assembly may be flexibly adjusted based on the shape or required capacity of a device in which a battery cell having the electrode assembly mounted therein is installed. Specifically, the electrode assembly may include two or three electrode plates. Alternatively, the electrode assembly may include four or more electrode plates.

In a more concrete example, each of the electrode plates may be formed in the shape of a rectangular parallelepiped. Alternatively, each of the electrode plates may be formed in the shape of a regular hexahedron.

Each of the electrode plates may have right-angled corners or at least one of the corners of each of the electrode plates may be curved. More specifically, at least one of four corners of each of the electrode plates formed in a quadrangular shape in plane may be curved. In a case in which at least one of the corners of each of the electrode plates is curved as described above, impact applied to the curved corner of each of the electrode plates is reduced when the electrode assembly is dropped, thereby improving safety.

The electrode tabs may have the same size or different sizes. Specifically, at least one selected from among overall widths, overall lengths, and overall heights of the electrode tabs may be different. Alternatively, the electrode tabs may have the same overall width, overall length, and overall height. The electrode tabs may be coupled to electrode leads to form electrode terminals of a lithium secondary battery.

In the above description, the plane means any plane. That is, the plane may be the ground or a plane perpendicular to the ground. Consequently, the electrode plates may be stacked on the ground in the height direction. Alternatively, the electrode plates may be stacked on the plane perpendicular to the ground in the height direction.

Hereinafter, the plane may be referred to as the ground for ease of understanding. In this case, the height direction from the plane may be referred to as the opposite direction of gravity and the direction opposite to the height direction may be referred to as the direction of gravity.

For example, the expression "the electrode plates are stacked in the height direction on the basis of the plane" in the above description may mean that the electrode plates may be stacked from the ground in the direction of gravity and/or in the opposite direction of gravity. Consequently, the stacked direction of the electrode plates may be the direction of gravity and/or the opposite direction of gravity.

In the structure in which the electrode plates are stacked, a relatively large-sized one of the electrode plates, having different sizes, disposed adjacent to each other in a state in which the separation film is disposed between the electrode plates may be an anode plate.

In a case in which a relatively large-sized one of the electrode plates disposed adjacent to each other in a state in which the separation film is disposed between the electrode plates is an anode plate, the anode plate may function as a safety member when an object, such as a nail, presses or penetrates the battery. Consequently, a primary minute short circuit of the battery may be caused, thereby preventing combustion and explosion of the battery.

The function of the anode plate as the safety member is very important in a battery module or a battery pack in which combustion and explosion of a battery constituting the battery module or the battery pack may lead to combustion and explosion of the battery module or the battery pack.

In addition, in a case in which a relatively large-sized one of the electrode plates disposed adjacent to each other in a state in which the separation film is disposed between the electrode plates is an anode plate, it is possible to minimize dendritic growth during charge and discharge of the battery as compared with in a case in which a relatively large-sized one of the electrode plates disposed adjacent to each other in a state in which the separation film is disposed between the electrode plates is a cathode plate.

However, the present invention is not limited thereto. For example, a relatively large-sized one of the electrode plates may be a cathode plate.

In addition, the lowermost one of the stacked electrode plates may be an anode plate or a cathode plate. In a case in which the lowermost one of the stacked electrode plates is a cathode plate, cathode slurry may be applied to only one major surface of the cathode plate facing an anode plate in a state in which the separation film is disposed between the cathode plate and the anode plate. Specifically, the cathode slurry may be applied only to a region of one major surface of the cathode plate corresponding to one major surface of the anode plate stacked in a state in which the separation film is disposed between the cathode plate and the anode plate.

The surface of each of the electrode plates from which the electrode tabs protrude may be referred to as the front of each of the electrode plates and the surface opposite to the front of each of the electrode plates may be referred to as the rear of each of the electrode plates. In addition, surfaces of each of the electrode plates parallel to the plane may be referred to as one major surface and the other major surface of each of the electrode plates. Furthermore, the surface of each of the electrode plates perpendicular to one major surface and the other major surface and parallel to the height direction may be one side surface of each of the electrode plates and the surface opposite to one side surface of each of the electrode plates may be the opposite side surface. One side surface and/or the other side surface may be referred to as sides.

The electrode plates may be stacked such that at least one selected from among the fronts, the rears, and the sides of the electrode plates is not on the same plane. Specifically, the electrode plates may be stacked such that only the fronts of the electrode plates are arranged on the same plane, such that only the rears of the electrode plates are arranged on the same plane, or such that one side surfaces and/or the other side surfaces of the electrode plates are arranged on the same plane. Alternatively, the electrode plates may be stacked such that all of the fronts, the rears, one side surfaces, and the other side surfaces of the electrode plates are not arranged on the same plane. In a case in which the electrode plates are stacked such that all of the fronts, the rears, one side surfaces, and the other side surfaces of the electrode plates are not arranged on the same plane, the electrode assembly according to the present invention may be formed in the shape of a frustum of a quadrangular pyramid. The stack arrangement of the electrode plates as described above is merely a concrete example of the present invention, and therefore, the arrangement of the electrode plates is not limited to the above example.

In a case in which the electrode plates are stacked in the height direction on the basis of the plane and the direction opposite to the height direction, i.e. in opposite directions, the electrode plates stacked in the height direction on the basis of the plane and the electrode plates stacked in the direction opposite to the height direction may be symmetrically or asymmetrically stacked.

Specifically, in a case in which the electrode plates are symmetrically stacked in the opposite directions, the electrode plates may be stacked such that only the fronts of the electrode plates are arranged on the same plane in the height direction and only the rears of the electrode plates are arranged on the same plane in the direction opposite to the height direction. In addition, one side surfaces and the other side surfaces of the stacked electrode plates may arranged on the same plane in the height direction and in the direction opposite to the height direction. The stack arrangement of the plates as described above is merely a concrete example of the present invention, and therefore, the arrangement of the electrode plates is not limited to the above example.

In a case in which the electrode plates are stacked such that only the fronts of the electrode plates are arranged on the same plane in the height direction and only the rears of the electrode plates are arranged on the same plane in the direction opposite to the height direction as described above, the electrode assembly according to the present invention may be configured such that the electrode plates are asymmetrically stacked in the height direction and in the direction opposite to the height direction.

In addition, the electrode plates may be stacked such that the fronts, the rears, one side surfaces, and the other side surfaces of the electrode plates are not arranged on the same plane in the opposite directions. In this case, the electrode assembly according to the present invention may be formed in the shape of a symmetric frustum of an octagonal pyramid. Of course, those skilled in the art may easily understand from the above description that the electrode plates may be stacked such that the electrode assembly may be formed in the shape of an asymmetric frustum of an octagonal pyramid.

In the stack structure of the electrode plates, electrode tabs may protrude from the respective electrode plates such that the electrode tabs of the electrode plates having the same polarity are arranged on the same virtual perpendicular line. That is, on the basis of the position at which the electrode tabs of the smallest one of the electrode plates having the same polarity are formed, the electrode tabs of the other electrode plates may be electrically connected to the electrode tabs of the smallest electrode plate on the same virtual perpendicular line.

For example, on the basis of the position at which the cathode tabs of the smallest one of the electrode plates having the same polarity are formed, the cathode tabs of the other electrode plates may be electrically connected to the cathode tabs of the smallest electrode plate on the same virtual perpendicular line.

The one-unit sheet type separation film may be located at a stack interface between the electrode plates while covering one major surface and the other major surface and one side surface and/or the other side surface of each of the electrode plates having opposite polarities to prevent the occurrence of a short circuit between a cathode and an anode.

The one-unit sheet type separation film may be located at one major surface and the other major surface of each of the electrode plates to prevent the occurrence of a short circuit between a cathode of one electrode plate and an anode of another electrode plate facing the cathode of one electrode plate. In addition, the sheet type separation film may cover one side surface and/or the other side surface of each of the electrode plates to securely maintain interface contact between the electrode plates and the separation film due to repetitive charge and discharge. Specifically, tensile force generated during winding of the separation film may provide pressure to achieve tight interface contact between the electrode plates and the separation film.

The separation film may have a sufficient length to cover one major surface and the other major surface and one side surface and/or the other side surface of each of the electrode plates.

On the other hand, the length of the separation film may be longer than the above-defined length. In this case, the remaining portion of the separation film covering one major surface and the other major surface and one side surface and/or the other side surface of each of the electrode plates may cover the outside of the electrode plate stack and the end of the separation film may be fixed by thermal welding or taping.

In a case in which the separation film covers one major surface and the other major surface and one side surface and/or the other side surface of each of the electrode plates as described above, the separation film may be disposed in tight contact with one major surface and the other major surface of each of the electrode plates.

On the other hand, in a case in which the separation film covers one major surface, the other major surface, and sides of each of the electrode plates and then covers the outside of the electrode plate stack, the separation film may not be disposed in tight contact with one side surface and/or the other side surface of each of the electrode plates having different sizes.

In this case, therefore, the portion of the separation film spaced apart from one side surface and/or the other side surface of each of the electrode plates may be cut or heated such that the separation film tightly contacts one side and/or the other side of each of the electrode plates.

Meanwhile, even in a case in which the separation film covers one major surface and the other major surface and one side surface and/or the other side surface of each of the electrode plates, the separation film may not be disposed in tight contact with one side surface and/or the other side surface of each of the electrode plates having different sizes.

Even in this case, therefore, the portion of the separation film spaced apart from one side surface and/or the other side surface of each of the electrode plates may be cut or heated such that the separation film tightly contacts one side surface and/or the other side surface of each of the electrode plates.

The stair-like structure may be formed from the stack structure of the electrode plates having different sizes.

Specifically, a stair-like structure having one step may be formed in a case in which a cathode plate and an anode plate having different sizes are stacked in a state in which a separation film is disposed between the cathode plate and the anode plate and one side surface and/or the other side surface of the cathode plate and one side surface and/or the other side surface of the anode plate are covered by the separation film.

On the other hand, a stair-like structure having two steps may be formed in a case in which three electrode plates having different sizes are stacked such that electrode plates having opposite polarities face each other while a separation film is disposed between the electrode plates and such that one side surface and/or the other side surface of each of the electrode plates is covered by the separation film.

Those skilled in the art may easily understand a stair-like structure having three or more steps from the above description, and therefore, a further detailed description thereof will be omitted.

A region at which the stair-like structure is formed is not particularly restricted. Specifically, in a case in which the electrode plates are stacked such that only the fronts of the electrode plates are arranged on the same plane, the stair-like structure may be formed at the rears, one side surfaces, or the other side surfaces of the electrode plates. On the other hand, in a case in which the electrode plates are stacked such that the fronts, the rears, and the sides of the electrode plates are not arranged on the same plane, the stair-like structure may be formed at the fronts, the rears, and the sides of the electrode plates. Those skilled in the art may easily understand the region at which the stair-like structure is formed from the above description, and therefore, a further detailed description thereof will be omitted.

The stair-like structure has a width and a height. The width of the stair-like structure may correspond to the difference between the overall widths or the overall lengths of the stacked electrode plates and the height of the stair-like structure may be the sum of the heights of steps. The height of each step may correspond to the height of each of the stacked electrode plates. The width and/or step height of the stair-like structure may be changed based on the curvature of a device in which a battery cell having an electrode assembly is mounted.

The stair-like structure may have (i) the same step height and different widths or (ii) different widths and step heights.

In the above description, the separation film is located at the stack interface between the electrode plates, such as the cathode plates or the anode plates, while covering the sides of each of the electrode plates. However, the scope of the present invention is not limited thereto.

The electrode assembly according to the present invention may include a unit cell configured to have a structure in which electrode plates having opposite polarities are alternately stacked in the height direction on the basis of a plane in a state in which a separator plate is disposed between some of the electrode plates. In this structure, it is possible for the separation film to securely maintain interface contact between the electrode plates and the separator plate and between the unit cell and the separation film.

In this case, the lowermost one of the stacked electrode plates may be a cathode plate and cathode slurry may be applied to only one major surface of the cathode plate facing an anode plate in a state in which the separation plate is disposed between the cathode plate and the anode plate. Specifically, the cathode slurry may be applied only to a region of one major surface of the cathode plate corresponding to one major surface of the anode plate stacked in a state in which the separation plate is disposed between the cathode plate and the anode plate.

The electrode plates having the same polarity constituting the unit cell may have the same size or different sizes.

Each of the electrode plates and the separator plate may be formed in a flat shape or a curved flat shape.

The electrode assembly according to the present invention may include one or more electrode plates, one or more other electrode plates having the same size as or different sizes from one or more electrode plates, one or more unit cells having the same size as or different sizes from one or more electrode plates, and one or more other unit cells having the same size as or different sizes from one or more unit cells.

The stack structure of the electrode plates having different sizes, the stack structure of the electrode plates having different sizes and the unit cells having different sizes, or the stack structure of the unit cells having different sizes may form a stair-like structure including one or more steps, each having a width and a height.

Each of the unit cells may be manufactured by adding a separator plate and an electrode plate to a portion or the entirety of the electrode plates.

Specifically, the uppermost electrode plate and the lowermost electrode plate of each of the unit cells may have the same polarity. Alternatively, the uppermost electrode plate and the lowermost electrode plate of each of the unit cells may have different polarities. In addition, the unit cells, the uppermost electrode plate and the lowermost electrode plate of each of which have the same polarity, may be unit cells, the uppermost electrode plate and the lowermost electrode plate of each of which are cathode plates. Alternatively, the unit cells, the uppermost electrode plate and the lowermost electrode plate of each of which have the same polarity, may be unit cells, the uppermost electrode plate and the lowermost electrode plate of each of which are anode plates.

In accordance with another aspect of the present invention, there is provided a composite electrode assembly.

The composite electrode assembly is configured to have a structure in which at least two polar bodies selected from a group including an electrode plate having electrode tabs, a stacked and folded type electrode assembly including two or more electrode plates having the same size and a one-unit sheet type separation film to cover one major surface and the other major surface of each of the electrode plates and side surfaces of the electrode plates, which constitute an electrode tab non-formation region, the electrode plates being stacked in a height direction on the basis of a plane such that the electrode plates having opposite polarities face each other in a state in which the separation film is disposed between the electrode plates, and a stacked type electrode assembly including electrode plates having opposite polarities are stacked in a height direction on the basis of a plane in a state in which a separator plate is disposed between the electrode plates are stacked in the height direction on the basis of the plane such that the electrode plates having opposite polarities are arranged in a state in which the separator plate or the sheet type separation film is disposed between the electrode plates and the polar bodies include one or more polar bodies and one or more other electrode plates having the same size as or different sizes from one or more electrode plates and a stack structure of the polar bodies having different sizes forms a stair-like structure including one or more steps, each having a width and a height.

A relatively large-sized one of the electrode plates disposed adjacent to each other in a state in which the separator plate or the separation film is disposed between the electrode plates may be an anode plate or a cathode plate.

In addition, the lowermost one of the stacked electrode plates may an anode plate or a cathode plate. In this case, cathode slurry may be applied to only one major surface of the lowermost cathode plate facing an anode plate in a state in which the separation film is disposed between the cathode plate and the anode plate.

In the same manner as in the above description, the stair-like structure may have (i) the same step height and different widths or (ii) different widths and step heights. The width and/or step height of the stair-like structure may be changed based on the curvature of a device in which a battery cell having the composite electrode assembly mounted therein is installed.

In accordance with a further aspect of the present invention, there is provided a lithium secondary battery configured to have a structure in which the electrode assembly or the composite electrode assembly is mounted in a battery case in a sealed state such that the electrode assembly or the composite electrode assembly is impregnated with an electrolyte. The lithium secondary battery has electrode terminals configured to have a structure in which electrode tabs of the electrode assembly or the composite electrode assembly are coupled to electrode leads.

At least one selected from among overall widths, overall lengths, and overall heights of the electrode leads may be different. Alternatively, the electrode leads may have the same overall width, overall length, and overall height.

In a first concrete example, the stacked type electrode assembly may include a first electrode group configured to have a structure in which a cathode plate, an anode plate, and separator plates are laminated while being stacked such that the cathode plate or the anode plate and one of the separator plates are located at the outermost sides of the stacked type electrode assembly.

In a second concrete example, the stacked type electrode assembly may include a second electrode group configured to have a structure in which a cathode plate, an anode plate, and separator plates are laminated while being stacked such that the separator plates are located at the outermost sides of the stacked type electrode assembly.

For example, the first electrode group may be configured to have a structure in which a cathode plate, a separator plate, an anode plate, and a separator plate are laminated while being sequentially stacked or a structure in which an anode plate, a separator plate, a cathode plate, and a separator plate are laminated while being sequentially stacked.

In a third concrete example, the stacked type electrode assembly may include a third electrode group configured to have a structure in which a cathode plate, an anode plate, and a separator plate are laminated while being stacked in a state in which the separator plate is disposed between the cathode plate and the anode plate such that the cathode plate and the anode plate are located at the outermost sides of the stacked type electrode assembly.

In a fourth concrete example, the stacked type electrode assembly may include a fourth electrode group configured to have a structure in which a cathode plate or an anode plate and a separator plate are laminated while being stacked.

The stacked type electrode assembly may be configured to have a structure in which only first electrode groups are stacked, a structure in which only second electrode groups are stacked, a structure in which only third electrode groups are stacked, a structure in which only fourth electrode groups are stacked, or a structure in which the first, second, third, and fourth electrode groups are combined.

For example, the stacked type electrode assembly may be configured to have a structure in which only the first electrode groups are stacked.

The second electrode group may be stacked at the uppermost end or the lowermost end of the first electrode group.

In the structure in which only the second electrode groups are stacked, a cathode plate or an anode plate may be disposed between the second electrode groups.

Ends of the separator plate may extend such that the separator plate has a length larger than the size of the cathode plate and the anode plate, i.e. the horizontal length or the vertical length. The extending ends of the separator plate may be connected to each other by thermal welding.

Meanwhile, a fixing member to more securely maintain the stack structure of the cathode plate, the separator plate, and the anode plate may be added to the first electrode group to the fourth electrode group.

The fixing member may be an additional external member different from the first electrode group or the second electrode group. The fixing member may be an adhesive tape or a bonding tape to cover a portion or the entirety of the outside of the first electrode group.

The outside of the first electrode group may include sides, a top, a front, and a rear of the first electrode group.

The fixing member may be a portion of the separator plate constituting the first electrode group or the second electrode group. In this case, the ends of the separator plate may be thermally welded to fix the first electrode group or the second electrode group. However, the present invention is not limited thereto.

The fixing member may include all members that are capable of fixing the first electrode group or the second electrode group.

In a case in which the stacked type electrode assembly is configured to include the first electrode group and the second electrode group, it possible to improve productivity and yield as compared with the stacked type electrode assembly configured to have a structure in which the cathode plate, the anode plate, and the separator plate are simply stacked.

In addition, the cathode plate, the separator plate, and the anode plate are laminated in unit of the first electrode group, and therefore, it is possible to minimize expansion in volume of the stacked type electrode assembly due to swelling.

In a case in which the stacked type electrode assembly is configured to include the first electrode group and the second electrode group, misalignment of the electrode assembly caused during a folding process is prevented and omission of processing equipment is possible. In addition, it is possible to form the first electrode group or the second electrode group using only one laminator. In addition, it is possible to manufacture the stacked type electrode assembly by simple stacking. Consequently, damage to electrodes caused during the folding process may be reduced and electrolyte wettability may be improved. Furthermore, a single-sided organic and inorganic composite separator, e.g. a safety reinforced separator (SRS), may be used as the separator plate exposed outside. Consequently, cell thickness may be decreased and, at the same time, processing cost may be reduced.

The battery case is formed of a laminate sheet including a resin layer and a metal layer. The battery case may have a receiving part, in which the electrode assembly or the composite electrode assembly having the stair-like structure according to the present invention is mounted. The receiving part may have a stair-like structure corresponding to the shape of the electrode assembly or the composite electrode assembly having the stair-like structure according to the present invention.

The lithium secondary battery may be used as a power source for a mobile phone, a portable computer, a smartphone, a smart pad, a netbook computer, a light electric vehicle (LEV), an electric vehicle, a hybrid electric vehicle, a plug-in hybrid electric vehicle, and a power storage unit.

Effects of the Invention

As is apparent from the above description, the electrode assembly and the composite electrode assembly according to the present invention include a stair-like structure changed based on the curvature of a device. Consequently, the present invention has an effect of increasing the capacity of the device per unit volume by utilizing a dead space defined in the device unlike a conventional electrode assembly.

DESCRIPTION OF DRAWINGS

The above and other objects, features and other advantages of the present invention will be more clearly understood from the following detailed description taken in conjunction with the accompanying drawings, in which.

DETAILED DESCRIPTION OF THE INVENTION

Now, preferred embodiments of the present invention will be described in detail with reference to the accompanying drawings. It should be noted, however, that the scope of the present invention is not limited by the illustrated embodiments.

Figure 1A:
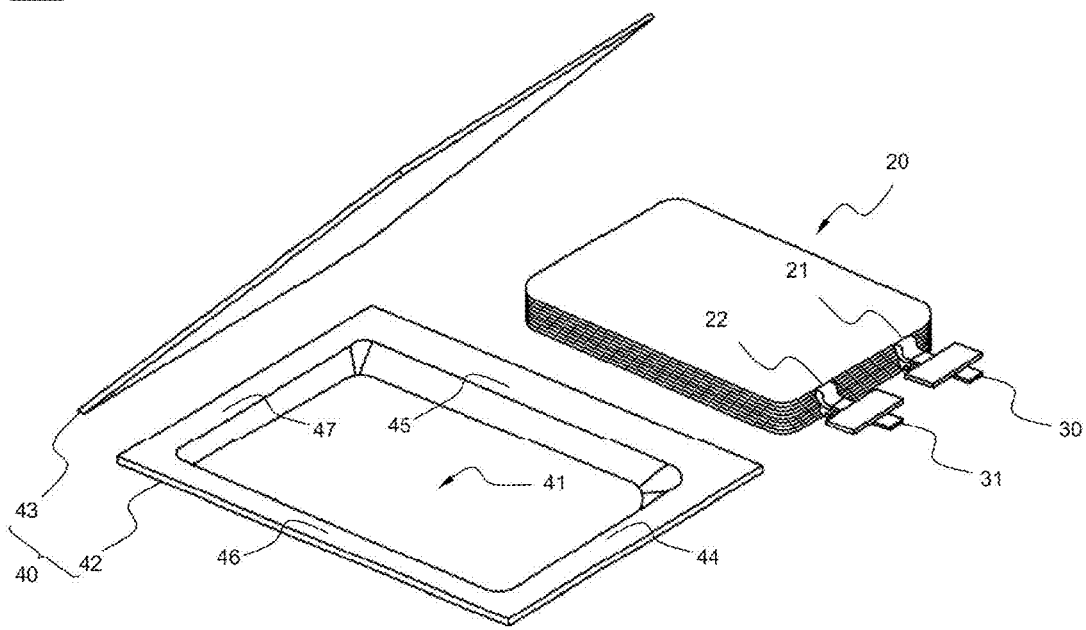
FIGS. 1A and 1B are exploded perspective views showing a conventional representative pouch-shaped secondary battery.
Figure 1B:
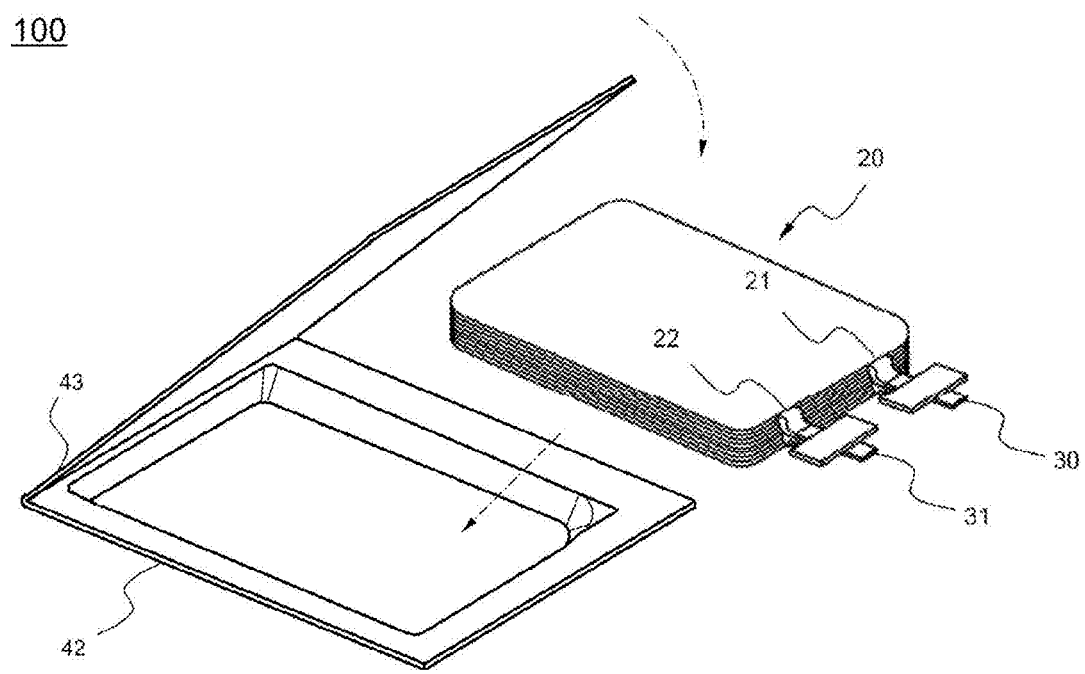
Figure 2:
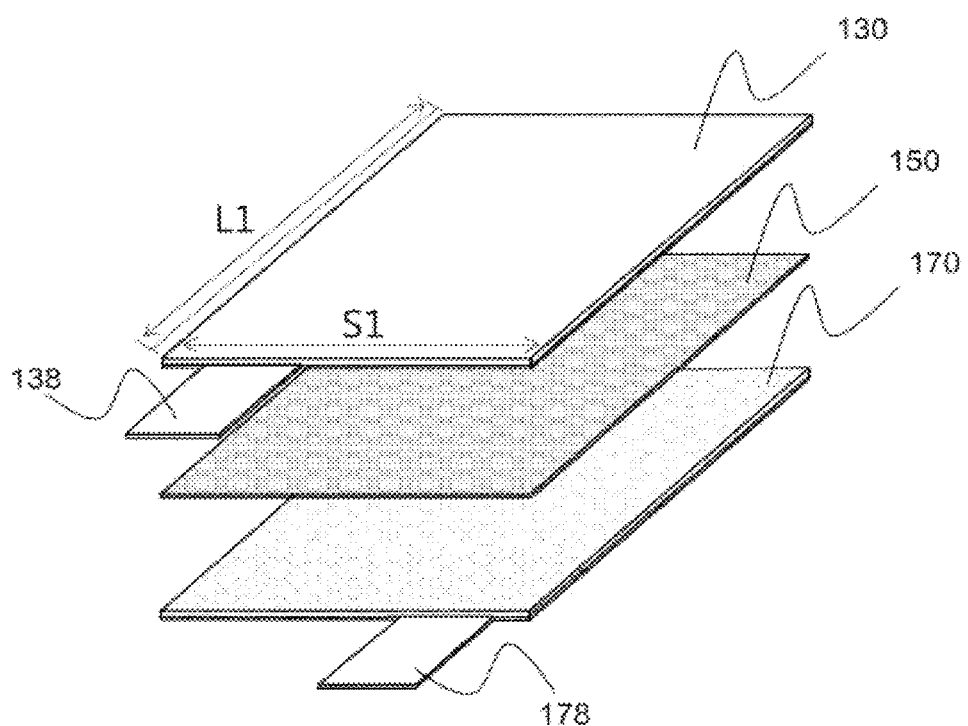
FIGS. 2 and 3 are a perspective view and a vertical sectional view typically showing electrode plates and a separator plate constituting an electrode assembly according to the present invention.
Figure 3:
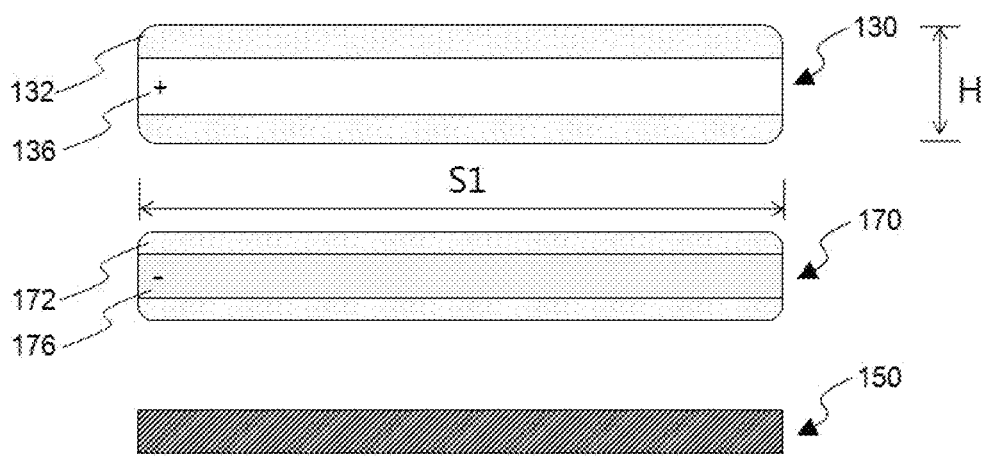

A cathode plate 130, an anode plate 170, and a separator plate 150 constituting an electrode assembly according to the present invention are typically shown in FIGS. 2 and 3. Referring to FIGS. 2 and 3, the cathode plate 130 is configured to have a structure in which cathode slurry 132 is applied to a cathode current collector 136 and the anode plate 170 is configured to have a structure in which anode slurry 172 is applied to an anode current collector 176.

In the cathode plate 130 of FIG. 2, the cathode slurry 132 is applied to the top and bottom of the cathode current collector 136. In the anode plate 170 of FIG. 2, the anode slurry 172 is applied to the top and bottom of the anode current collector 176. The cathode plate 130 and the anode plate 170 of FIGS. 2 and 3 are formed in the shape of a rectangular parallelepiped having an overall length L1, an overall width S1, and an overall height H.

Figure 4:
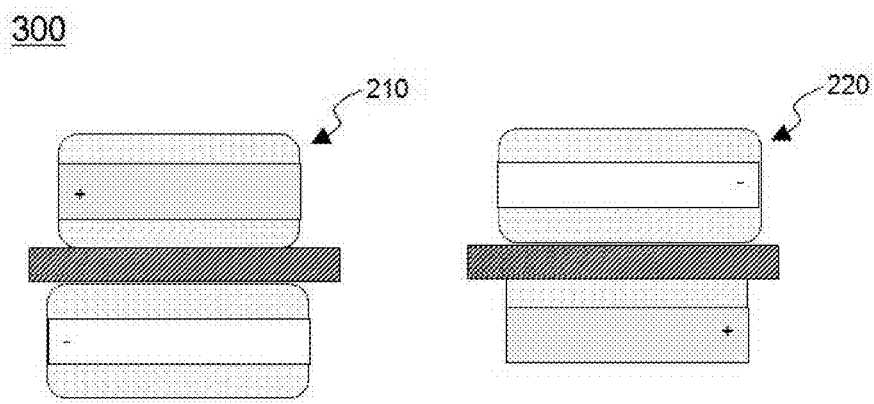
FIGS. 4 and 5 are vertical sectional views typically showing unit cells configured to have a structure in which the uppermost electrode plate and the lowermost electrode plate have different polarities.
Figure 5:
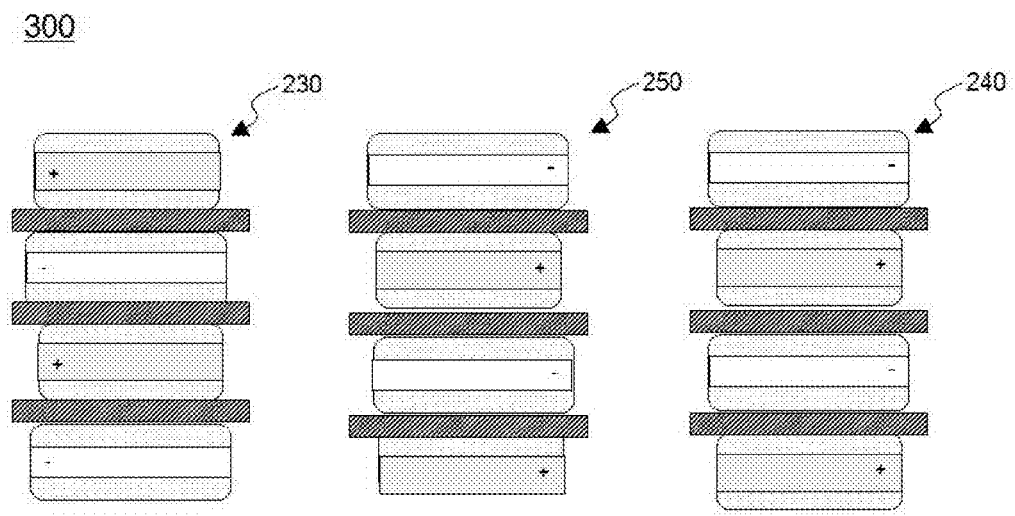
Figure 6:
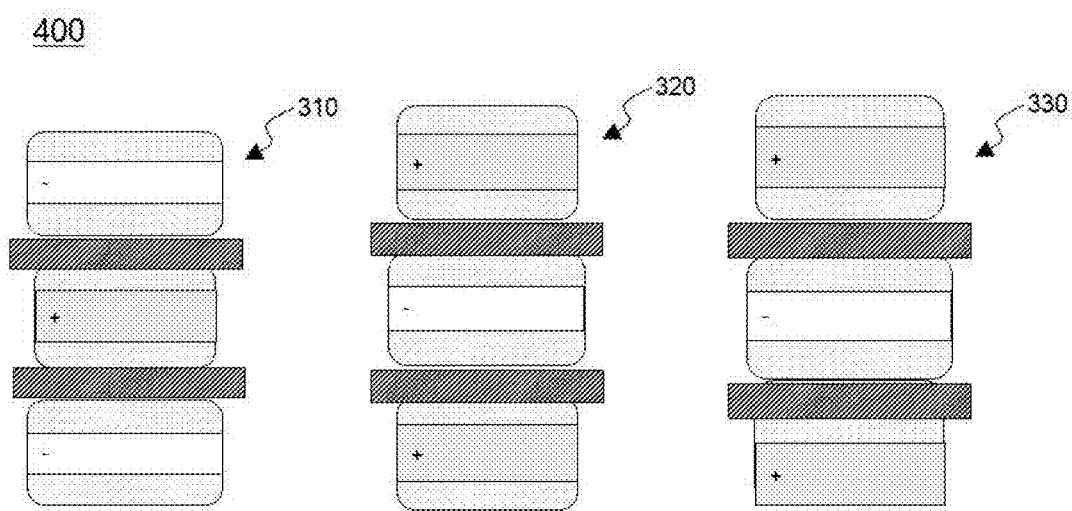
FIG. 6 is a vertical sectional view typically showing unit cells configured to have a structure in which the uppermost electrode plate and the lowermost electrode plate have the same polarity.

FIGS. 4 to 6 are vertical sectional views typically showing stacked type electrode assemblies 300 and 400 configured to have a structure in which the cathode plate 130 and the anode plate 170 of FIG. 3 are alternately stacked in the height direction on the basis of a plane parallel to the stack plane in a state in which the separator plate 150 is disposed between the cathode plate 130 and the anode plate 170.

In stacked type electrode assemblies 210, 220, 230, 240, and 250 of FIGS. 4 and 5, the uppermost electrode plate and the lowermost electrode plate have different polarities. In stacked type electrode assemblies 310, 320, and 330 of FIG. 6, on the other hand, the uppermost electrode plate and the lowermost electrode plate have the same polarity.

Cathode slurry is applied to only one major surface of the lowermost cathode plate of each of the stacked type electrode assemblies 220, 250, and 330 directly contacting the separator plate stacked on the lowermost cathode plate.

Figure 7:
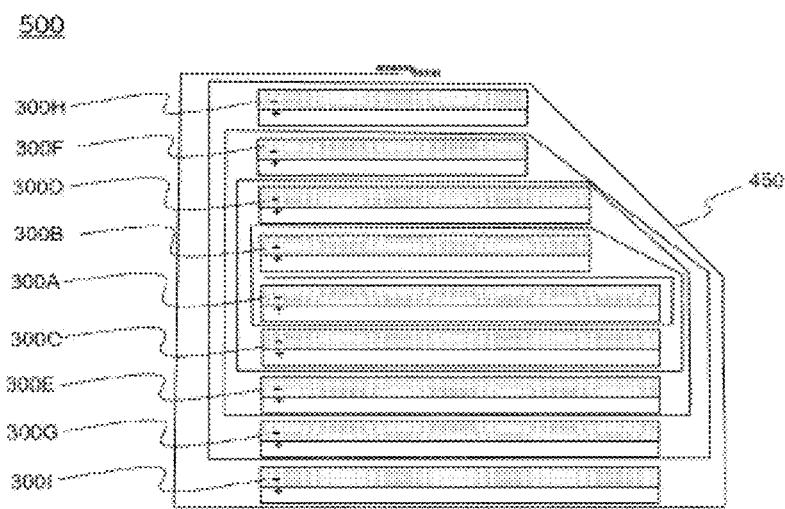
FIG. 7 is a vertical sectional view typically showing an electrode assembly according to an embodiment of the present invention.

FIG. 7 is a vertical sectional view typically showing an electrode assembly according to the present invention including only the stacked type electrode assemblies of FIGS. 4 and 5. Specifically, stacked type electrode assemblies 300I, 300G, 300E, 300C, and 300A having the same and larger overall width than stacked type electrode assemblies 300B, 300D, 300F, and 300H are sequentially stacked on the lowermost end of the electrode assembly in the height direction on the basis of a plane. Stacked type electrode assemblies 300B and 300D having the same and smaller overall width than the stacked type electrode assemblies 300I, 300G, 300E, 300C, and 300A are sequentially stacked on the upper end of the stacked type electrode assembly 300A. Stacked type electrode assemblies 300F and 300H having the same and smaller overall width than the stacked type electrode assemblies 300B and 300D are sequentially stacked on the upper end of the stacked type electrode assembly 300D.

The lowermost electrode assembly 300I may be the stacked type electrode assembly 220 or 250 of FIG. 4 or 5.

The electrode assemblies 300I, 300G, 300E, 300C, 300A, 300B, 300D, 300F, and 300H are stacked such that one side surfaces or the other side surfaces of the electrode assemblies 300I, 300G, 300E, 300C, 300A, 300B, 300D, 300F, and 300H are aligned or on the same plane.

One major surface, the other major surface, one side surface, and the other side surface of each of the electrode assemblies 300I, 300G, 300E, 300C, 300A, 300B, 300D, 300F, and 300H are covered by a separation film 450. The outside of a stack constituted by the electrode assemblies 300I, 300G, 300E, 300C, 300A, 300B, 300D, 300F, and 300H is also covered by the separation film 450.

After the outside of the stack constituted by the electrode assemblies 300I, 300G, 300E, 300C, 300A, 300B, 300D, 300F, and 300H is covered by the separation film 450, the separation film 450 may be fixed by thermal welding or taping. In FIG. 7, the separation film 450 is fixed by taping after the outside of the stack constituted by the electrode assemblies 300I, 300G, 300E, 300C, 300A, 300B, 300D, 300F, and 300H is covered by the separation film 450.

Figure 8:
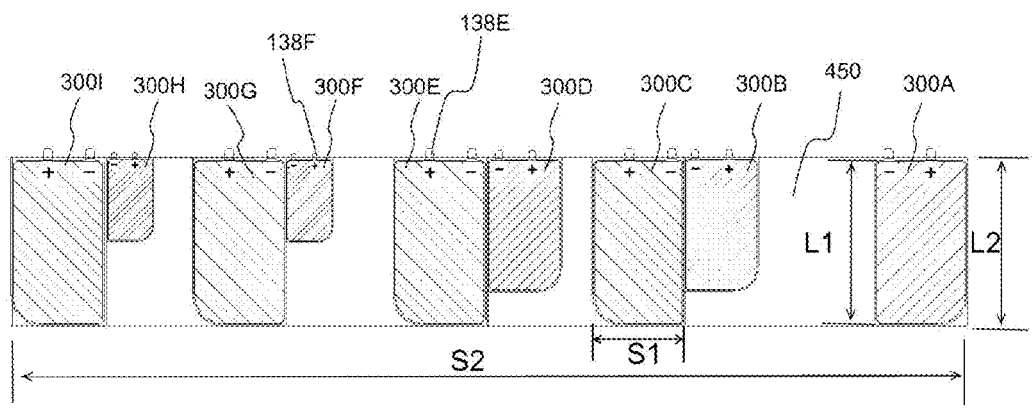
FIG. 8 is a development view typically showing the electrode assembly of FIG. 7.

FIG. 8 is a development view typically showing the electrode assembly of FIG. 7. Specifically, the electrode assembly 300A is spaced apart from the electrode assembly 300B by a distance corresponding to the sum of the overall width S1 of the electrode assembly 300A and the height of the electrode assembly 300B on the separation film 450 having a width L2 equivalent to the electrode assemblies 300A, 300C, 300E, and 300I having the largest overall length L1 in the length (S2) direction of the separation film 450. In addition, the electrode assembly 300C is spaced apart from the electrode assembly 300B by a distance equivalent to the sum of the heights of the electrode assemblies 300A and 300B and the thickness of the separation film 450 on the separation film 450 in the length (S2) direction of the separation film 450. In this way, the electrode assemblies 300A, 300B, 300C, 300D, 300E, 300F, 300G, 300H, and 300I are sequentially arranged on the separation film 450 at predetermined intervals. The electrode assembly 300A is located at a folding start point and the electrode assembly 300I is located at a folding end point.

The separation film, on which the electrode assemblies 300A, 300B, 300C, 300D, 300E, 300F, 300G, 300H, and 300I are arranged as described above, may be folded to manufacture the electrode assembly of FIG. 7.

One corner of each of the electrode assemblies 300A, 300B, 300C, 300D, 300E, 300F, 300G, 300H, and 300I of FIG. 8 is curved in plane. Of course, even in a case in which corners of each of the electrode assemblies 300A, 300B, 300C, 300D, 300E, 300F, 300G, 300H, and 300I of FIG. 8 are right-angled in plane, the electrode assemblies 300A, 300B, 300C, 300D, 300E, 300F, 300G, 300H, and 300I may be arranged as shown in FIG. 8 to manufacture the electrode assembly of FIG. 7.

Referring to FIG. 8, the overall width of electrode tabs of the electrode assemblies 300A, 300C, 300E, 300G, and 300I is larger than that of electrode tabs of the electrode assemblies 300B and 300D. Similarly, the overall width of the electrode tabs of the electrode assemblies 300B and 300D is larger than that of electrode tabs of the electrode assemblies 300F and 300H.

Specifically, cathode tabs 138E and 138F of the electrode assemblies 300E and 300F have different overall widths. On the other hand, the electrode tabs of the electrode assemblies 300A, 300B, 300C, 300D, 300E, 300F, 300G, 300H, and 300I may have the same overall width.

In FIG. 8, the separation film 450 has a sufficient length S2 to cover one major surface, the other major surface, one side surface, and the other side surface of each of the electrode assemblies 300I, 300G, 300E, 300C, 300A, 300B, 300D, 300F, and 300H. However, those skilled in the art will easily understand that the separation film 450 has a sufficient length to cover the outside of the stack constituted by the electrode assemblies 300I, 300G, 300E, 300C, 300A, 300B, 300D, 300F, and 300H.

In FIG. 7, a space corresponding to the difference in overall width between the electrode assembly 300A and the electrode assembly 300B is formed at a stack interface between the electrode assembly 300A and the electrode assembly 300B. In addition, a space corresponding to the difference in overall width between the electrode assembly 300D and the electrode assembly 300F is formed at a stack interface between the electrode assembly 300D and the electrode assembly 300F. Consequently, a stair-like structure having a width and a height is formed at stack interfaces among the electrode assemblies 300A, 300B, and 300F. The width of the stair-like structure may be changed according to the difference in overall width among the electrode assemblies 300A, 300B, and 300F. The electrode plates forming the width of the stair-like structure are anode plates. Alternatively, the electrode plates forming the width of the stair-like structure may be cathode plates 130, such as cathode plates 130 of a composite electrode assembly shown in FIG. 13.

In connection with this case, the electrode assembly of FIG. 7 uses the stacked type electrode assemblies having different overall widths of FIGS. 4 and 5. Therefore, those skilled in the art will easily understand from the above description that even in a case in which the stacked type electrode assemblies have different overall lengths, the stair-like structure may have a width corresponding to the difference in overall lengths among the stacked type electrode assemblies.

In addition, in FIG. 7, the electrode assemblies 300I, 300G, 300E, 300C, 300A, 300B, 300D, 300F, and 300H have the same height. Consequently, the sum of the heights of the two electrode assemblies 300B and 300D is smaller than the sum of the heights of the four electrode assemblies 300I, 300G, 300C, and 300A. As a result, the electrode assembly of FIG. 7 includes a stair-like structure having a height difference. As previously described, the width and the height of the stair-like structure may be changed based on the curvature of a curved device.

Figure 11:
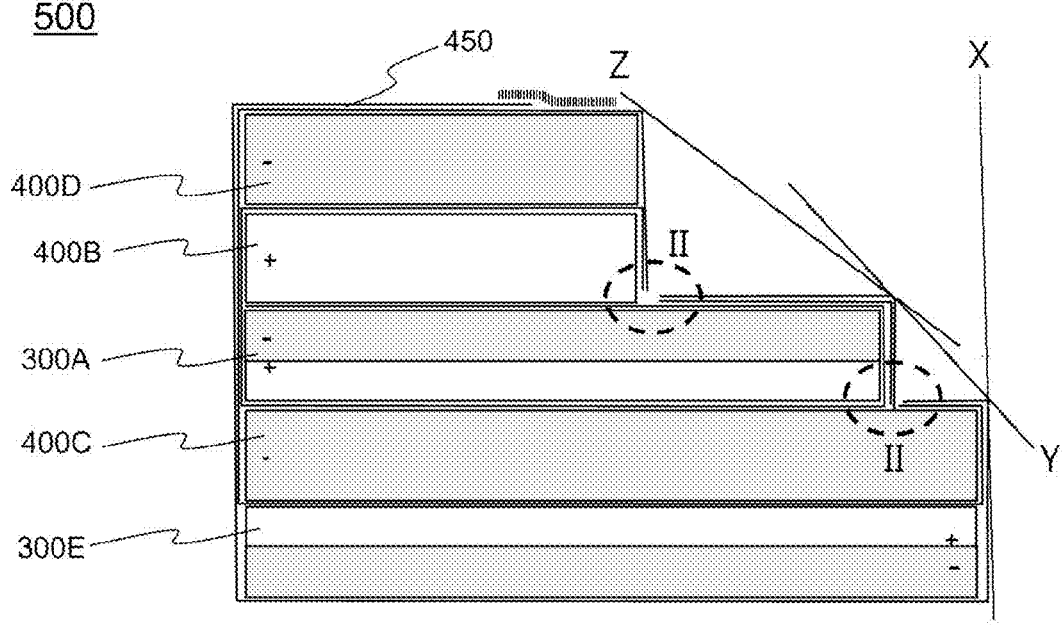

In connection with this case, FIG. 11 is a vertical sectional view typically showing an electrode assembly according to the present invention including the stacked type electrode assemblies of FIGS. 4 to 6.

The electrode assembly of FIG. 11 is different from the electrode assembly of FIG. 7 in that stacked type electrode assemblies 300E and 400C having the same and larger overall width than stacked type electrode assemblies 300A, 400B, and 400D are sequentially stacked on the lowermost end of the electrode assembly in the height direction on the basis of a plane, a stacked type electrode assembly 300A having a smaller overall width than the stacked type electrode assemblies 300E and 400C is stacked on the upper end of the stacked type electrode assembly 400C, and stacked type electrode assemblies 400B and 400D having the same and smaller overall width than the stacked type electrode assembly 300A are sequentially stacked on the upper end of the stacked type electrode assembly 300A.

In addition, the electrode assembly of FIG. 11 is different from the electrode assembly of FIG. 7 in that a separation film 450 tightly contacts one major surface, the other major surface, one side surface, and the other side surface of each of the electrode assemblies 300E, 400C, 300A, 400B, and 400D. Specifically, the separation film 450 is cut such that the separation film 450 tightly contacts one side surface or the other side surface of each of the electrode assemblies 300E, 400C, 300A, 400B, and 400D at which a stair-like structure is formed (see dotted-line circles II).

Referring to FIG. 11, an angle between a straight line Y tangent to an angular point of the stack constituted by the electrode assemblies 300E and 400C and to an angular point of the electrode assembly 300A and an arbitrary perpendicular line X tangent to one side surface or the other side surface of each of the electrode assemblies 300E and 400C having the largest overall width is smaller than an angle between a straight line Z tangent to an angular point of the stack constituted by the electrode assemblies 400B and 400D and to the angular point of the electrode assembly 300A and the perpendicular line X. However, these angles may be changed based on the curvature of a device.

Figure 9:
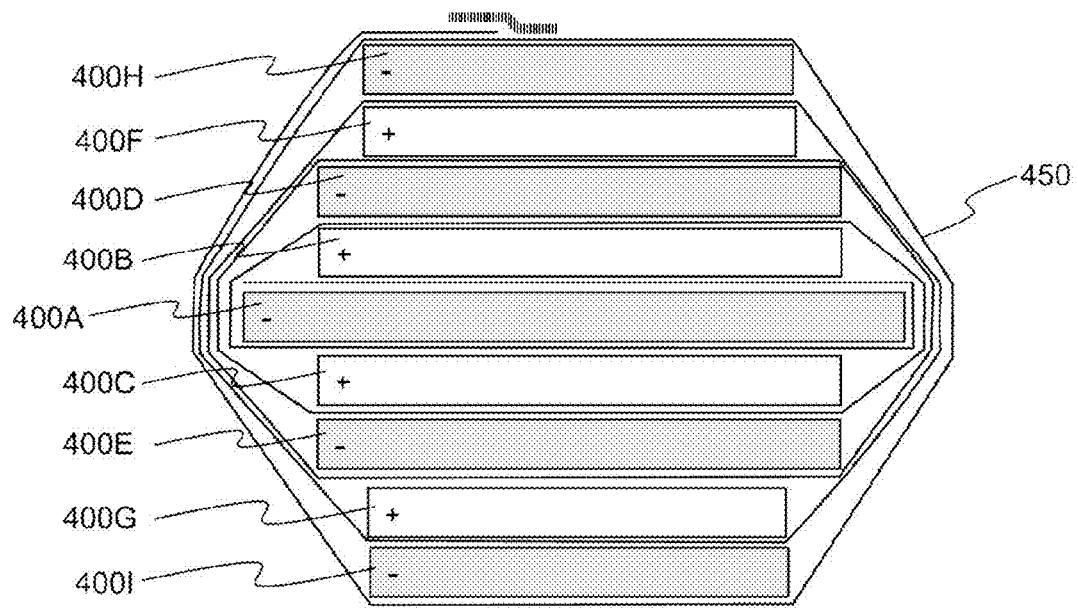
FIGS. 9 to 12 are vertical sectional views showing an electrode assembly according to another embodiment of the present invention.

An electrode assembly of FIG. 9 is different from the electrode assembly of FIG. 7 in that electrode assemblies 400A, 400B, 400C, 400D, 400E, 400F, 400G, 400H, and 400I, the uppermost electrode plate and the lowermost electrode plate of each of which have the same polarity, are stacked in the height direction and the direction opposite to the height direction, i.e. in opposite directions, on the basis of a plane. In this case, the electrode assemblies 400A, 400B, 400C, 400D, 400E, 400F, 400G, 400H, and 400I may be cathode plates or anode plates.

In addition, the electrode assembly of FIG. 9 is different from the electrode assembly of FIG. 7 in that one side surfaces or the other side surfaces of the electrode assemblies 400A, 400B, 400C, 400D, 400E, 400F, 400G, 400H, and 400I are neither aligned nor on the same plane.

Figure 10:
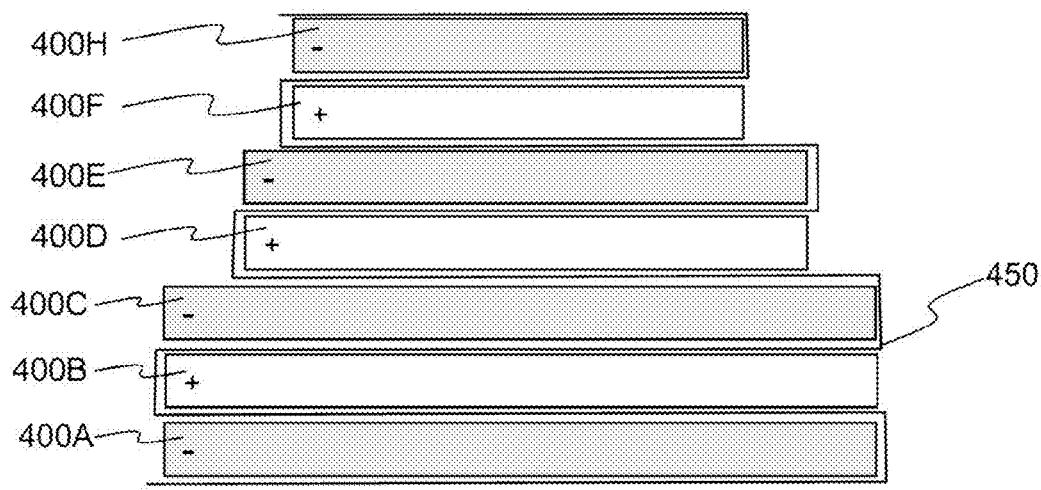

An electrode assembly of FIG. 10 is different from the electrode assembly of FIG. 9 in that electrode assemblies 400A, 400B, 400C, 400D, 400E, 400F, 400G, and 400H, the uppermost electrode plate and the lowermost electrode plate of each of which have the same polarity, are stacked only in the height direction or the direction opposite to the height direction on the basis of a plane.

In addition, the electrode assembly of FIG. 10 is different from the electrode assembly of FIG. 9 in that a separation film 450 covers only one side surface or the other side surface of each of the electrode assemblies 400A, 400B, 400C, 400D, 400E, 400F, 400G, and 400H.

Figure 12:
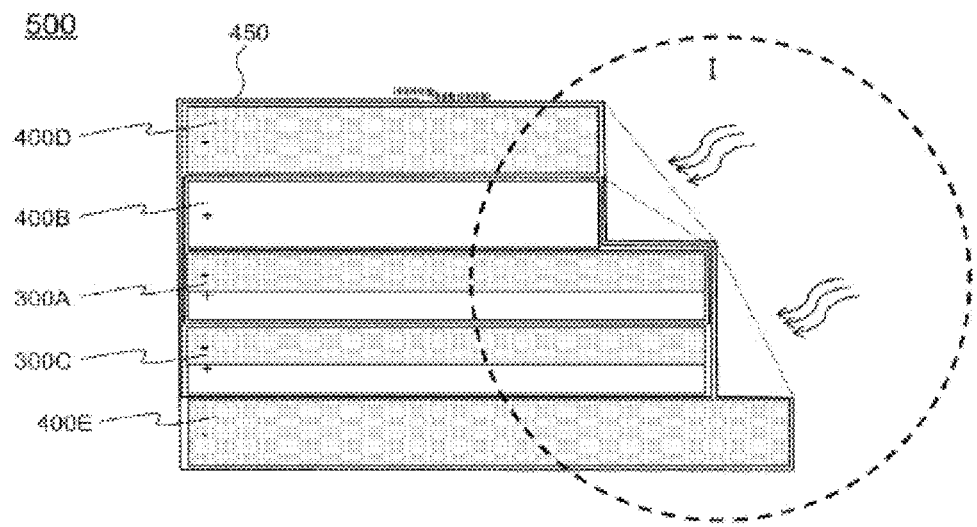

An electrode assembly of FIG. 12 is identical to the electrode assembly of FIG. 11 in that the electrode assembly of FIG. 12 includes the stacked type electrode assemblies of FIGS. 4 to 6. However, the electrode assembly of FIG. 12 is different from the electrode assembly of FIG. 11 in that a separation film 450 is heated such that the separation film 450 tightly contacts one side surfaces or the other side surfaces of electrode assemblies 300A, 400B, 300C, 400D, and 400E at which a stair-like structure is formed (see a dotted-line circle I).

Figure 13:
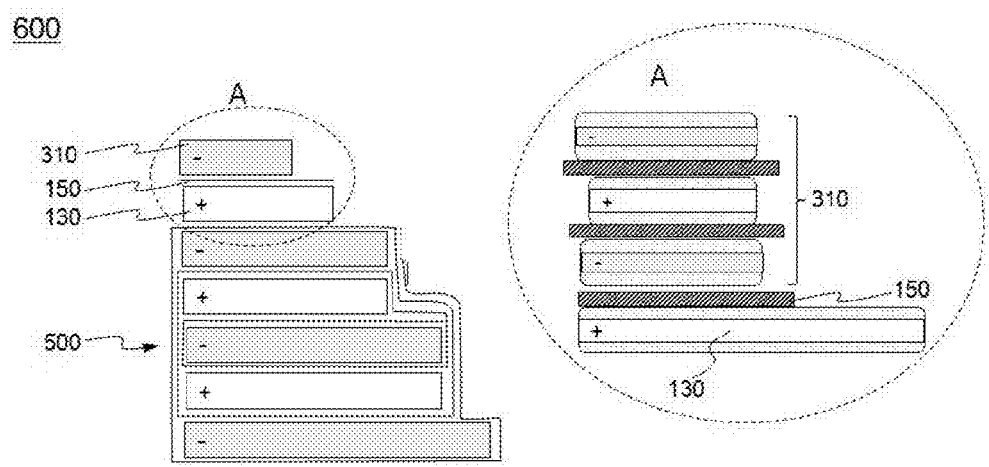
FIG. 13 is a vertical sectional view typically showing a composite electrode assembly according to an embodiment of the present invention.

FIG. 13 is a typical view showing a composite electrode assembly 600 according to an embodiment of the present invention wherein an electrode assembly 500 according to the present invention and a stacked type electrode assembly 310, the uppermost electrode plate and the lowermost electrode plate of which have different polarities, are stacked in a state in which a cathode plate 130 and a separator plate 150 are disposed between the electrode assembly 500 and the stacked type electrode assembly 310 to form a stair-like structure.

Those skilled in the art will easily understand the structure of the composite electrode assembly 600 from the above description of the electrode assembly 500 except that the cathode plate or the anode plate and/or the stacked type electrode assemblies of FIGS. 3 to 5 and the electrode assembly 500 are combined to form a stair-like structure.

The cathode plate 130, facing the lowermost anode of the stacked type electrode assembly 310 in a state in which the separator plate 150 is disposed between the cathode plate 130 and the stacked type electrode assembly 310, has an overall width larger than that of the lowermost anode of the stacked type electrode assembly 310. In order to prevent direct contact between the cathode plate 130 and an electrolyte, therefore, an anode plate may be located in a space of the stair-like structure corresponding to the difference in overall width between the cathode plate 130 and the stacked type electrode assembly 310. The size of the anode plate may correspond to the area of the space of the stair-like structure corresponding to the difference in overall width between the cathode plate 130 and the stacked type electrode assembly 310.

Figure 14:
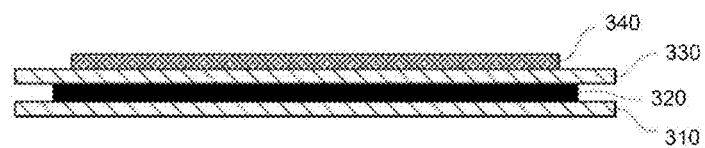
FIG. 14 is a view showing the structure of a first electrode group according to an embodiment of the present invention.

As shown in FIG. 14, a first electrode group is configured to have a structure in which a separator plate 310, a cathode plate 320, a separator plate 330, and an anode plate 340 are laminated while being sequentially stacked.

Figure 15:
FIG. 15 is a view showing the structure of a second electrode group according to an embodiment of the present invention.

As shown in FIG. 15, a second electrode group is configured to have a structure in which a separator plate 410, an anode plate 420, and a separator plate 430 are laminated while being sequentially stacked.

Figure 16:
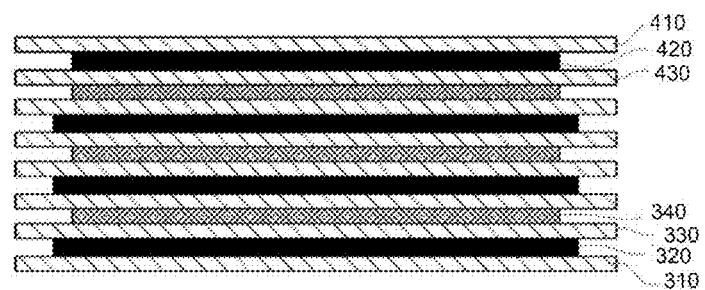
FIG. 16 is a typical view showing a stacked type electrode assembly according to an embodiment of the present invention.

FIG. 16 shows a stacked type electrode assembly configured to have a structure in which the second electrode group of FIG. 15 is stacked on the uppermost end of a first electrode group stack constituted by first electrode groups, one of which is shown in FIG. 14.

Figure 17:
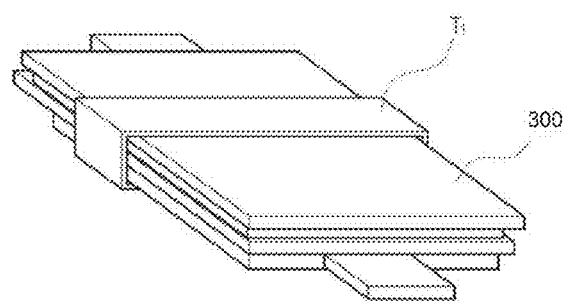
FIG. 17 is a typical view showing a fixing structure of the first electrode group of FIG. 14.
Figure 17:
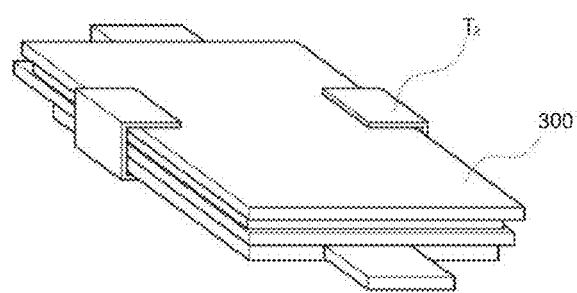

FIG. 17 shows an embodiment in which a fixing member $T_1$ is added to the first electrode group of FIG. 14. Specifically, the fixing member $T_1$ is added to the side or the front of the first electrode group 300.

In order to secure stack stability of a simple stack structure, an additional fixing member may be added to the side of the stack structure to fix the stack structure. The fixing member may be realized as a tape $T_1$ surrounding the entire surface of the first electrode group 300 as shown in FIG. 17(*a*). Alternatively, the fixing member may be realized as a fixing member $T_2$ to fix only each side of the electrode group 300 as shown in FIG. 17(*b*).

Figure 18:
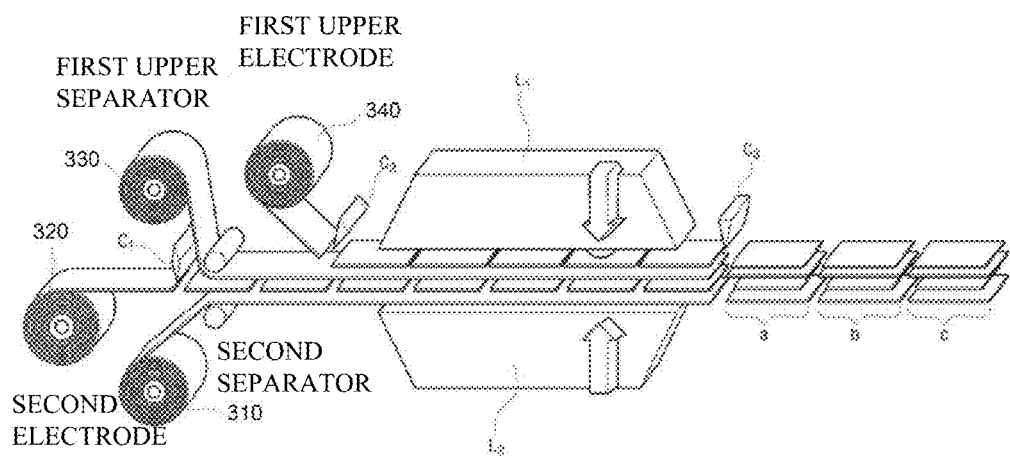
FIG. 18 is a view showing a process of manufacturing a first electrode group according to an embodiment of the present invention.

FIG. 18 is a view typically showing a process of manufacturing the first electrode group according to the present invention.

As shown in FIG. 18, materials for a separator plate 310, a cathode plate 320, a separator plate 330, and an anode plate 340 are simultaneously loaded (using sheet type loading units). The material for the cathode plate 320, which is used as a middle layer, is cut into a designed size and is then loaded into laminators $L_1$ and $L_2$. Subsequently, the materials for the separator plates 310 and 330, which are disposed under and above the material for the cathode plate 320, are simultaneously loaded into the laminators $L_1$ and $L_2$. At the same time, the material for the anode plate 340 is loaded into the laminators $L_1$ and $L_2$.

Subsequently, the laminators $L_1$ and $L_2$ form a structural body in which the two electrode plates and the two separator plates are laminated to each other using heat and pressure, i.e. a first electrode group. Subsequently, a cutter $C_3$ cuts the structural body into a plurality of first electrode groups. Afterwards, various inspection processes, such as a thickness inspection (a), a vision inspection (b), and a short circuit inspection (c), may be performed with respect to each first electrode group.

Subsequently, each first electrode group manufactured as described above is fixed using a fixing member, and the first electrode groups are stacked to constitute a structural body in which the first electrode groups are stacked. Subsequently, the second electrode group shown in FIG. 15 is stacked on the structural body and then the second electrode group and the structural body are fixed using a fixing member, thereby completing a stacked type electrode assembly.

Figure 19:
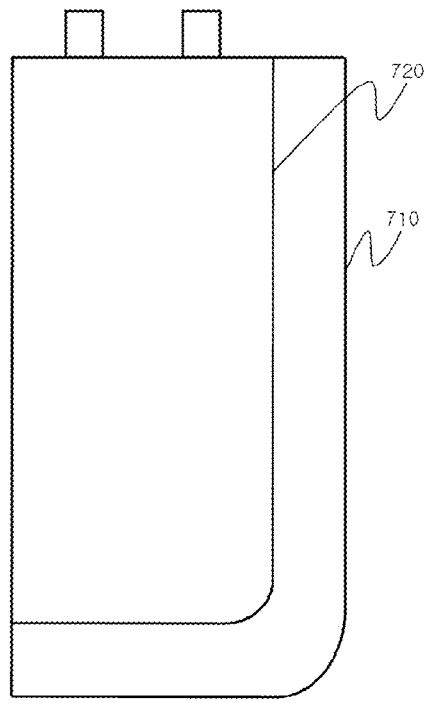
FIG. 19 is a plan view showing an electrode assembly according to a further embodiment of the present invention.

FIG. 19 is a plan view typically showing an electrode assembly according to a further embodiment of the present invention.

Referring to FIG. 19, an electrode assembly 700 includes a first electrode group 710 and a second electrode group 720. The structure of the electrode groups constituting the electrode assembly 700 excluding the number of the electrode groups is identical to that of each of the above embodiments, and therefore, a detailed description thereof will be omitted.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A composite electrode assembly comprising:
   at least two polar bodies selected from a group consisting of:
   (i) an electrode plate,
   (ii) a stacked and folded type electrode assembly comprising two or more electrode plates having the same size and a one-unit sheet type separation film to cover one major surface, another major surface, and side surfaces of each of the electrode plates, which constitute an electrode tab non-formation region, the electrode plates being stacked in a height direction on the basis of a plane such that the electrode plates having opposite polarities face each other in a state in which the separation film is disposed between the electrode plates, and
   (iii) a stacked type electrode assembly comprising electrode plates having opposite polarities arc stacked in a height direction on the basis of a plane in a state in which a separator plate is disposed between the electrode plates;
   wherein at least two of the at least two polar bodies are different ones selected from the group consisting of (i), (ii), and (iii),
   wherein the at least two polar bodies being stacked in a height direction on the basis of a plane such that the electrode plates having opposite polarities are arranged in a state in which the separator plate or the sheet type separation film is disposed between the electrode plates; and
   wherein the composite electrode assembly further includes one or more other electrode plates having different sizes from the electrode plates of the respective electrode plate(s) of the at least two polar bodies, and a stack structure of the at least two polar bodies having different sizes forms a stair-like structure comprising one or more steps, each having a width and a height.

2. The composite electrode assembly according to claim 1, wherein a larger one of the respective electrode plates of the composite electrode assembly disposed adjacent to each other in a state in which the separator plate or the separation film is disposed between said electrode plates is an anode plate, wherein the larger one of the respective electrode plates is larger in terms of at least one of its width, length, and height.

3. The composite electrode assembly according to claim 1, wherein the electrode plate at a lowermost end of the composite electrode assembly is a cathode plate, cathode slurry being present on only one major surface of the cathode plate facing an anode plate in a state in which the separator plate or the separation film is disposed between the cathode plate and the anode plate.

4. The composite electrode assembly according to claim 1, wherein the electrode assembly includes at least one additional stair-like structure, the stair-like structures having the same heights and different widths.

5. The composite electrode assembly according to claim 4, wherein the width, the height, or the width and the height is configured based on curvature of a device in which a battery cell having the composite electrode assembly mounted therein is installed.

6. A lithium secondary battery comprising a composite electrode assembly according to claim 1, wherein the composite electrode assembly is mounted in a battery case in a sealed state such that the electrode assembly is impregnated with an electrolyte.

7. The composite electrode assembly according to claim 1, wherein one of the at least two polar bodies is an electrode plate.

8. The composite electrode assembly according to claim 1, wherein the electrode assembly includes at least one additional stair-like structure, the stair-like structures having different widths and heights.

* * * * *